Figure 1:
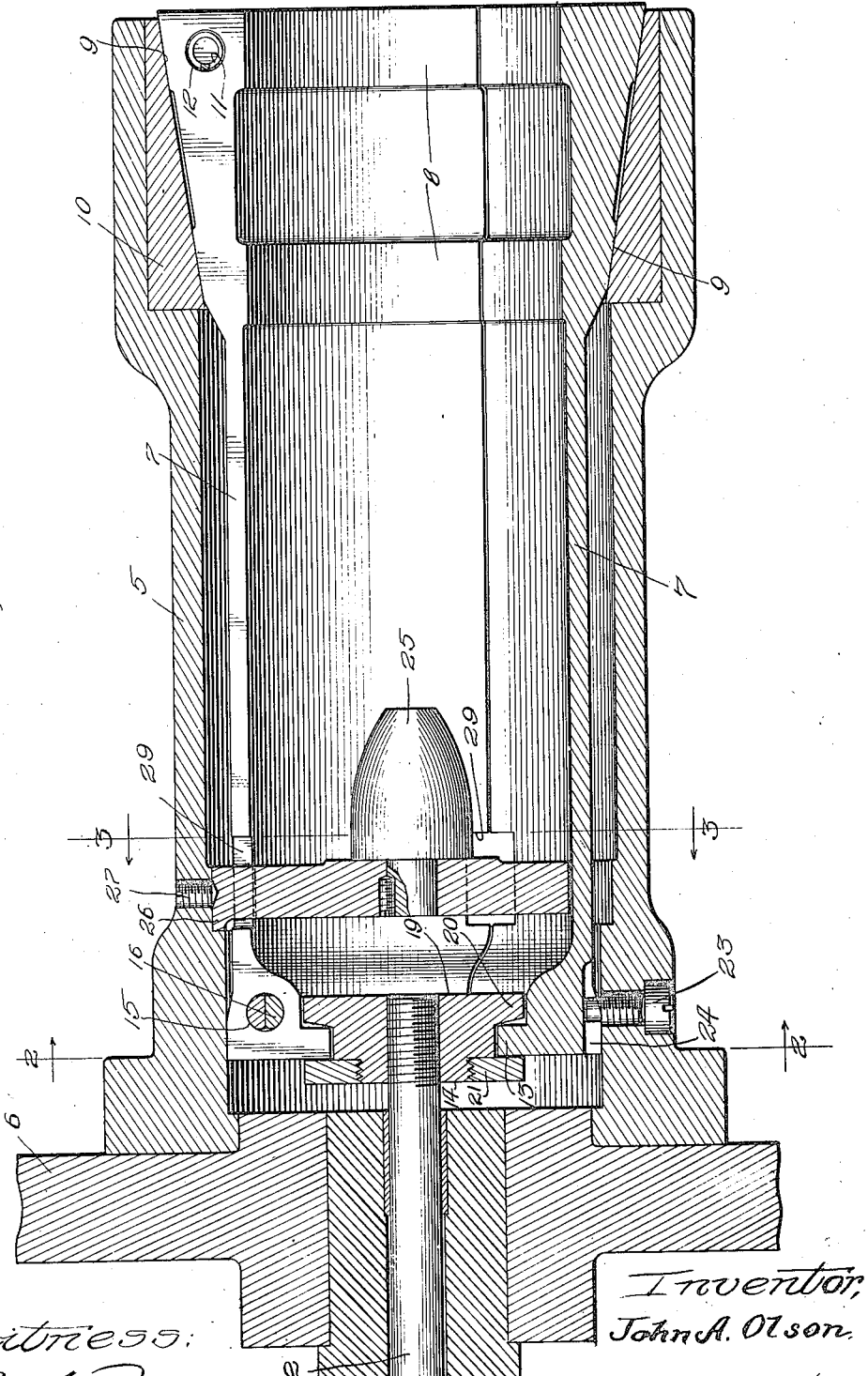

J. A. OLSON.
COLLET CHUCK.
APPLICATION FILED JUNE 7, 1918.

1,407,213.

Patented Feb. 21, 1922.
2 SHEETS—SHEET 1.

Witness:
R. L. Farrington

Inventor,
John A. Olson.
By Glenn S. Noble, Atty.

J. A. OLSON.
COLLET CHUCK.
APPLICATION FILED JUNE 7, 1918.
1,407,213.
Patented Feb. 21, 1922.
2 SHEETS—SHEET 2.
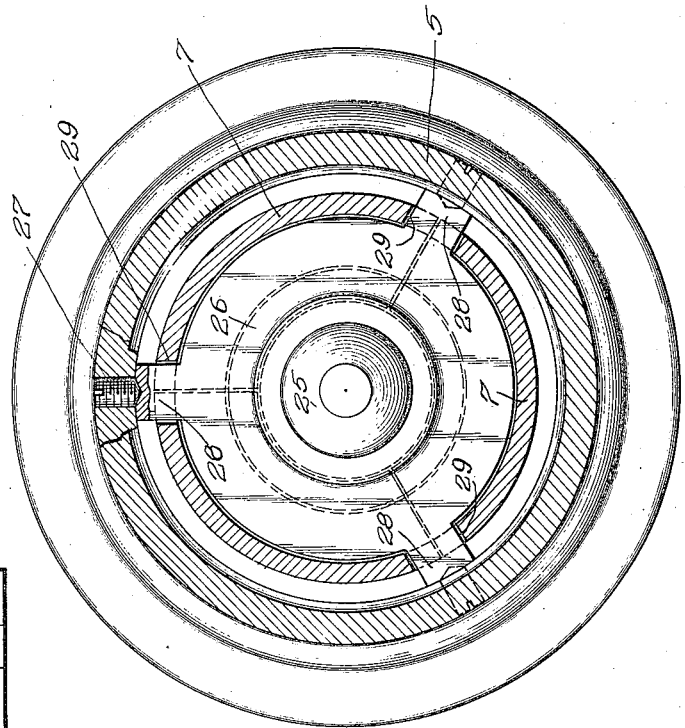
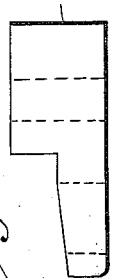
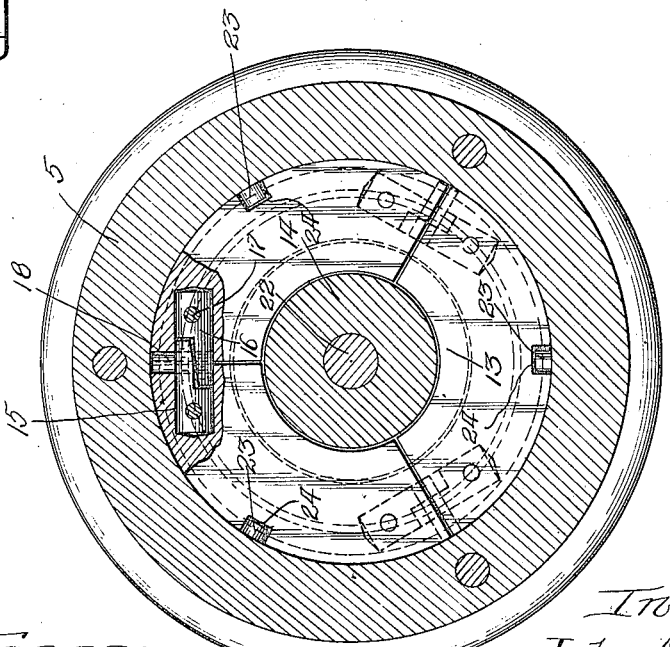
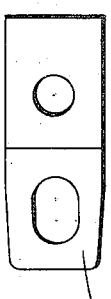
Witness:
R. L. Farrington
Inventor,
John A. Olson,
By Glenn S. Noble, Atty.

UNITED STATES PATENT OFFICE.

JOHN A. OLSON, OF CHICAGO, ILLINOIS, ASSIGNOR TO THE S-P MANUFACTURING COMPANY, OF CLEVELAND, OHIO, A CORPORATION OF OHIO.

COLLET CHUCK.

1,407,213.

Specification of Letters Patent. Patented Feb. 21, 1922.

Application filed June 7, 1918. Serial No. 238,737.

*To all whom it may concern:*

Be it known that I, JOHN A. OLSON, a citizen of the United States, residing at Chicago, in the county of Cook and State of Illinois, have invented certain new and useful Improvements in Collet Chucks, of which the following is a specification.

Although certain features of this invention may be adapted for use in chucks of general application, it is particularly adapted to pneumatic chucks.

The objects of this invention are to provide a chuck of the character indicated, of improved general construction, and which will be particularly efficient in operation; to provide a chuck having a collet or clamping jaws which are operated positively as well as being in part operated by opening springs; and in general to provide such an improved construction as will be described more fully hereinafter.

In the accompanying drawings illustrating this invention:

Fig. 1 is a longitudinal sectional view;
Fig. 2 is a cross sectional view taken on the line 2—2 of Fig. 1; and, Fig. 3 is a cross sectional view taken on the line 3—3 of Fig. 1.

And, Figs. 4 and 5 are details of one of the hinge members.

In its preferred form, as shown in these drawings, this invention comprises a body 5 which may be secured in any desired manner, to the face plate 6 of a lathe, or to any part of such machine to which the chuck may be applied. The collet 7 may be formed with as many jaws as desired, but in this instance it is shown as being formed of three sections. These jaws are provided at their outer ends with one or more gripping faces 8 for engagement with the work piece. The jaws are also provided with tapered faces 9, which engage with a correspondingly tapered ring 10, which fits in the outer end of the body 5. Spreader or opening springs 11 are arranged in sockets 12 at the ends of the jaws, and tend to open the jaws. These jaws may be described as being in the form of segmental bell-crank levers, the long arms of which form the gripping portion, while the short arms or projections 13 are engaged by the actuating member 14. These jaws are hinged together at their inner ends by means of the novel hinges shown
in Figs. 1 and 2. The adjacent faces of the jaws have holes 15 for receiving the hinge members 16. As will be seen in particular from Fig. 2, these hinge members are preferably round or cylindrical for a portion of their length, and are flattened or cut away to form overlapping portions, the flattened surfaces of the co-acting members serving as the point of bearing or support during the hinge or swinging movement of the jaws. The hinge members are held in place by dowel pins 17, and are held together by pins or pintles 18. The jaws swing on the hinge members 16, these members being tapered or given sufficient clearance, and the inwardly extending arms 13 being tapered or given sufficient clearance, to permit such swinging movement, which, however, is usually very slight. The jaws would operate, after being assembled, without the pintles 18. These pintles are useful in preventing the parts from falling apart when they are withdrawn from the body or housing 5. By means of this arrangement, the outer or gripping ends of the jaws may swing or move inwardly and outwardly on these hinges. The actuating member 14 comprises a head 19, having a flange 20 for engagement with the outer faces of the arms 13, and a ring 21 which is screwed or otherwise secured to the head, and acts as a flange to engage with the inner faces of the arms 13. The head 19 is secured to the end of the rod or plunger 22 which is actuated by the pneumatic piston (not shown), or in any other suitable manner to give it a longitudinal movement. The collet is prevented from turning in the head by means of set screws 23 which pass through the head and have their inner ends in engagement with slots 24 in the collet jaws.

When it is desired to center the end of the work piece, which projects into the chuck, a centering plug 25 of any suitable shape may be provided. This plug is supported by a spider 26 which is secured in position by set screws 27 which engage with the outwardly projecting arms 28 of the spider which extend through openings 29 in the collet.

When the chuck is to be opened for receiving a work piece or anything which is to be held therein, the rod or plunger 22 is moved to the right, as shown in Fig. 1, which causes the ring 21 to press against the inwardly extending arms 13 of the bell-crank jaws. This causes the collet to be moved bodily to the right and, as the tapered end moves outwardly, the springs 11 tend to open the collet, but it also is given a positive opening movement by the pressure of the ring 21 against the inner ends of the levers which tends to throw the long arms or gripping members outwardly at their free ends. It will be seen in particular from Figs. 1 and 2 that the inner or left hand end of the collet fits closely within the cylindrical bore of the body or housing 5, and in order to allow for the opening movement of the outer ends of the jaws, their outer surfaces are cut away from a point opposite the hinge members for a sufficient distance so that they will not strike during the opening movement. When the work piece has been placed in position, the rod or plunger 22 is moved to the left, and the flange 20 engages with the arms or segmental ring 13 to pull the collet into gripping position. As the collet moves inwardly, the bevelled or tapered portions 9 engage with the correspondingly tapered surface of the ring 10, and the jaws are formed into engagement with the work piece. This gripping action is also assisted somewhat by the action of the flange 20 against the short arms of the bell-crank levers which tends to swing the long arms or gripping portions toward the center. As the jaws again close to engage with the work piece, the outer surfaces of the inner ends of the jaws again engage with the inner bore of the body or housing 5, so that the jaws will be centered and will run true in the bore of the housing.

It will be observed that the chuck will necessarily be varied in size and shape, as well as in certain details of construction, in order to accommodate different work, and therefore, I do not wish to be limited to the exact construction herein shown and described, except as specified in the following claims, in which I claim:

1. A chuck comprising a body portion, a collet co-acting with said body portion, said collet being formed of segmental jaws which are hinged directly together at one end and have inwardly extending projections adjacent to the hinges, and means co-acting with said projections only to move the collet longitudinally and also tending to swing the clamping ends of the jaws outwardly and inwardly.

2. A chuck comprising a body portion having a tapered surface at its outer end, a collet comprising a plurality of jaws hinged directly together at their inner ends, and having tapered surfaces for engagement with the tapered surface of the body, said jaws also having radial projections or arms adjacent to the hinges, a head having means for engaging with the outer and inner faces of said arms, and means for reciprocating said head.

3. A chuck comprising a body having a tapered surface, a collet having a tapered surface co-acting with said first named surface, said collet being formed of a plurality of jaws hinged directly together at one end and having radially arranged arms adjacent to said hinges, and means co-acting with said arms for reciprocating the collet and swinging the free ends of the jaws outwardly and inwardly.

4. The combination of a cylindrical body, a ring fitting in said body and having a tapered inner surface, segmental jaws mounted in said body and having tapered surfaces for engagement with said ring, said jaws also having inwardly extending arms at one end, means for hinging the jaws directly together adjacent to said arms, a rod, and a head on said rod adapted to engage directly with said arms for actuating the jaws.

5. A collet having a plurality of separate jaws hinged directly together at one end of the collet by tangentially arranged hinge members to permit the radial swinging movement of the clamping portions thereof, the arrangement being such that the parts of the collet are held together solely by said hinge members.

6. A substantially cylindrical collet comprising a plurality of separate jaws, and hinges at one end of the collet for connecting the jaws adapted to permit the radial movement of the opposite ends of the jaws, a cylindrical housing for receiving said collet, the cylindrical outer surface of the collet back of the hinges being adapted to bear against the inner bore of the housing when the collet is drawn to gripping position.

7. A substantially cylindrical collet comprising a plurality of segmental jaws, co-acting hinge members tangentially arranged at one end of said jaws, said hinge members having flattened engaging surfaces, the projecting portion of each member extending into a corresponding recess in the adjacent jaw.

8. In a chuck, the combination of a plurality of segmental jaws having gripping faces at one end thereof, said jaws having holes in the opposed faces adjacent to the opposite ends thereof, hinge members secured in said holes, and having flattened engaging portions, the projecting portion of each hinge member extending into the hole of the opposite jaw, substantially as described.

9. A chuck comprising a body having a tapered surface, a collet having separate jaws with tapered surfaces co-acting with the tapered surface of the body, two part hinge connected pins between the adjacent jaws, said jaws having means at one end for moving them longitudinally in both directions whereby all of the strain will be placed directly on the jaws and relieving all strain on the pins, said pins acting to cause the jaws to move together in their longitudinal travel.

JOHN A. OLSON.